(12) United States Patent
Choi et al.

(10) Patent No.: US 11,035,305 B2
(45) Date of Patent: Jun. 15, 2021

(54) 2-CYCLE ENGINE WITH VALVE SYSTEM AND METHOD FOR CONTROLLING THE ENGINE

(71) Applicants: Hyundai Motor Company, Seoul (KR); KIA Motors Corporation, Seoul (KR)

(72) Inventors: Myung Sik Choi, Seoul (KR); In Gee Suh, Yongin-si (KR); Woo Tae Kim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/589,442

(22) Filed: Oct. 1, 2019

(65) Prior Publication Data
US 2020/0325837 A1    Oct. 15, 2020

(30) Foreign Application Priority Data
Apr. 11, 2019    (KR) .......................... 10-2019-0042704

(51) Int. Cl.
| | |
|---|---|
| *F02D 41/00* | (2006.01) |
| *F01L 1/053* | (2006.01) |
| *F02D 39/04* | (2006.01) |
| *F02M 35/104* | (2006.01) |

(52) U.S. Cl.
CPC ........ *F02D 41/0007* (2013.01); *F01L 1/0532* (2013.01); *F02D 39/04* (2013.01); *F02M 35/104* (2013.01)

(58) Field of Classification Search
CPC .. F02D 41/0007; F02D 39/04; F02D 13/0215; F02D 13/0234; F02D 13/0249; F01L 1/047; F01L 1/1053; F01L 1/08; F02B 2710/03; F02B 2710/034; F02B 2710/036; F02B 2075/025; F02B 2720/233
See application file for complete search history.

(56) References Cited

U.S. PATENT DOCUMENTS

| | | | | |
|---|---|---|---|---|
| 5,158,044 A | * | 10/1992 | Kawamura | ............... F01L 1/08 |
| | | | | 123/21 |
| 5,939,794 A | * | 8/1999 | Sakai | ....................... B60K 6/46 |
| | | | | 290/40 A |
| 6,155,049 A | * | 12/2000 | Bischoff | ................. F02B 37/00 |
| | | | | 60/602 |

(Continued)

FOREIGN PATENT DOCUMENTS

KR    10-1365287    2/2014

*Primary Examiner* — Jesse S Bogue
*Assistant Examiner* — Loren C Edwards
(74) *Attorney, Agent, or Firm* — Brinks Gilson & Lione (57) ABSTRACT

The present disclosure relates to a 2-cycle engine with a valve system that generates power during every one crankshaft rotation. The 2-cycle engine of the present disclosure includes the valve system opening and closing an air intake valve and an exhaust valve and includes a turbocharger. In the turbocharger, the air intake valve and the exhaust valve are respectively opened and closed once during one crankshaft rotation, and the valve system is configured to control the turbocharger using difference between an air intake pressure and an exhaust pressure. Accordingly, a current air intake reaches a target air intake.

9 Claims, 8 Drawing Sheets

(56) References Cited

U.S. PATENT DOCUMENTS

| | | | |
|---|---|---|---|
| 6,334,417 B1* | 1/2002 | Salber | F02D 13/0203 |
| | | | 123/179.1 |
| 2017/0276067 A1* | 9/2017 | Hand, III | F02D 41/1448 |
| 2018/0223748 A1* | 8/2018 | Tulapurkar | F02D 13/0269 |

* cited by examiner

2-CYCLE ENGINE WITH VALVE SYSTEM AND METHOD FOR CONTROLLING THE ENGINE

CROSS-REFERENCE TO RELATED APPLICATION

This application claims priority to and the benefit of Korean Patent Application No. 10-2019-0042704, filed Apr. 11, 2019, which is incorporated herein by reference in its entirety.

FIELD

The present disclosure relates generally to a 2-cycle engine with a valve system and a method for controlling the engine.

BACKGROUND

The statements in this section merely provide background information related to the present disclosure and may not constitute prior art.

Generally, a 4-cycle engine is an internal combustion engine that generates power by performing a one cycle of air intake-compression-expansion-exhaust during two up-and-down movements of a piston.

The 4-cycle engine has advantages as follows: combustion is stable due to each cycle of the engine divided completely from each other, thermal load of any one each part is small due to cooling effect in an air intake cycle, and volume efficiency is high due to a sufficient period of the air intake cycle.

However, we have discovered that since one explosion cycle in the 4-cycle engine is performed during two crankshaft rotations, fluctuation of a rotation force is large. Since air displacement of the 4-cycle engine is larger than a 2-cycle engine of the same output, a size and weight of the 4-cycle engine are increased. In addition, the 4-cycle engine is increased in friction, exhaust, and cooling losses as the number of cycles in the 4-cycle engine is increased in comparison with the 2-cycle engine.

The above information disclosure in this Background section is only for enhancement of understanding of the background of the present disclosure, and therefore it may contain information that does not form the prior art that is already known to a person of ordinary skill in the art.

SUMMARY

The present disclosure relates to a 2-cycle engine with a valve system configured to generate power during every one crankshaft rotation.

According to one aspect of the present disclosure, a 2-cycle engine with a valve system includes a camshaft rotated in conjunction with a crankshaft, a valve system configured that an air intake valve and an exhaust valve are opened or closed depending on a camshaft rotation, a turbocharger compressing air and supplying the compressed air into a cylinder, and a controller controlling operation of the turbocharger using a difference between an intake pressure and an exhaust pressure so that a current air intake reaches a target air intake. In addition, the air intake valve and the exhaust valve may be opened and closed once, respectively, during one crankshaft rotation.

The crankshaft and the camshaft may be rotated at a rotation ratio of 1 to 1 (1:1).

The gear teeth of a crank sprocket mounted to the crankshaft and gear teeth of a cam sprocket mounted to the camshaft may be formed in sizes and shapes corresponding to each other.

The crankshaft and the camshaft may be rotated at a rotation ratio of 2 to 1 (2:1), and a cam provided on the camshaft may be provided with two cam lobes symmetrically disposed.

According to a further aspect of the present disclosure, the controller includes a calculation unit that calculates engine demand torque based on factors reflecting vehicle traveling conditions, calculates the target air intake desired for generating the engine demand torque, and calculates a target air intake/exhaust pressure difference value corresponding to the target air intake, an input unit receiving a current intake pressure of an air intake manifold and a current exhaust pressure of an exhaust manifold, an input unit receiving a current intake pressure of an air intake manifold and a current exhaust pressure of an exhaust manifold, a comparison determination unit comparing a current air intake/exhaust pressure difference value that is a difference value between the current intake pressure and the current exhaust pressure with the target air intake/exhaust pressure difference value, and an output unit controlling a rotation speed of the turbocharger to increase the rotation speed when the target air intake/exhaust pressure difference value is higher than the current air intake/exhaust pressure difference value and controlling the rotation speed of the turbocharger to decrease the rotation speed when the target air intake/exhaust pressure difference value is equal to or less than the current air intake/exhaust pressure difference value.

The input unit may receive the intake pressure at an air intake valve closing time as the current intake pressure, and receive the exhaust pressure at an exhaust valve closing time as the current exhaust pressure.

According to a further aspect of the present disclosure, valve timings of the air intake valve and the exhaust valve may be determined so that a cycle of air intake-compression-expansion-exhaust may be performed during a first cycle in which a piston is moved from a bottom dead center to a top dead center depending on the crankshaft rotation and a second cycle in which the piston is moved from the top dead center to the bottom dead center. The controller may control the exhaust valve to be opened during a process in which the piston is moved downward from the top dead center to the bottom dead center and to be closed at a timing at which the exhaust pressure is equal to or less than a reference value when the piston is near the bottom dead center. In addition, the controller may control the air intake valve to be opened, and to be closed after the piston passes the bottom dead center.

According to a further aspect of the present disclosure, the 2-cycle engine may further include a variable valve device controlling the valve timings of the air intake valve and the exhaust valve. In addition, the controller may determine whether the engine knocks, and control operation of the variable valve device so that the variable valve device may control a closing timing of the air intake valve.

According to a further aspect of the present disclosure, the 2-cycle engine may further include a motorization device including a motor, a generator, and an inverter in order to generate an electrical driving force along with a driving force of the engine.

According to a further aspect of the present disclosure, the air intake valve and the exhaust valve may be disposed at an upper portion of the cylinder and may be controlled by a cam.

A method for controlling the 2-cycle engine with the valve system of the present disclosure may be configured such that the controller controls operation of the turbocharger using difference between the intake pressure and the exhaust pressure so that the current air intake reaches the target air intake.

The method may include the steps of calculating engine demand torque based on factors reflecting a vehicle traveling state, calculating target air intake desired for generating the engine demand torque when current engine torque is less than the engine demand torque, calculating the target air intake/exhaust pressure difference value corresponding to the target air intake, calculating the current air intake/exhaust pressure difference value by receiving the current intake pressure of the air intake manifold and the current exhaust pressure of the exhaust manifold, controlling the rotation speed of the turbocharger to increase the rotation speed when the target air intake/exhaust pressure difference value is higher than the current air intake/exhaust pressure difference value, and controlling the rotation speed of the turbocharger to decrease the rotation speed when the target air intake/exhaust pressure difference value is equal to or less than the current air intake/exhaust pressure difference value.

As described above, the 2-cycle engine of the present disclosure performs one explosion cycle during every one crankshaft rotation, so that air displacement of the engine is reduced as compared with the 4-cycle engine of the same output, and the size and the weight of the engine can be reduced. In addition, friction, exhaust, and cooling losses of the 2-cycle engine are reduced as the number of cycles in the 2-cycle engine is reduced in comparison with the number of cycles in the 4-cycle engine, so that fuel efficiency is improved.

In addition, since the conventional 4-cycle engine is used as it is to realize the 2-cycle engine, there is no need to separately have a product line for the 2-cycle engine, and product cost is reduced. In addition, when the 2-cycle engine is applied to a hybrid vehicle, since volumes of the motorization device (the motor, the generator, and the inverter) can be increased as much as a volume of the engine is reduced, the efficiency of the hybrid vehicle can be increased.

By comparing the current air intake/exhaust pressure difference value and the target air intake/exhaust pressure difference value to vary the rotation speed of the turbocharger, the air intake flowing into a cylinder is controlled to provide stable combustion performance depending on engine load required in the engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
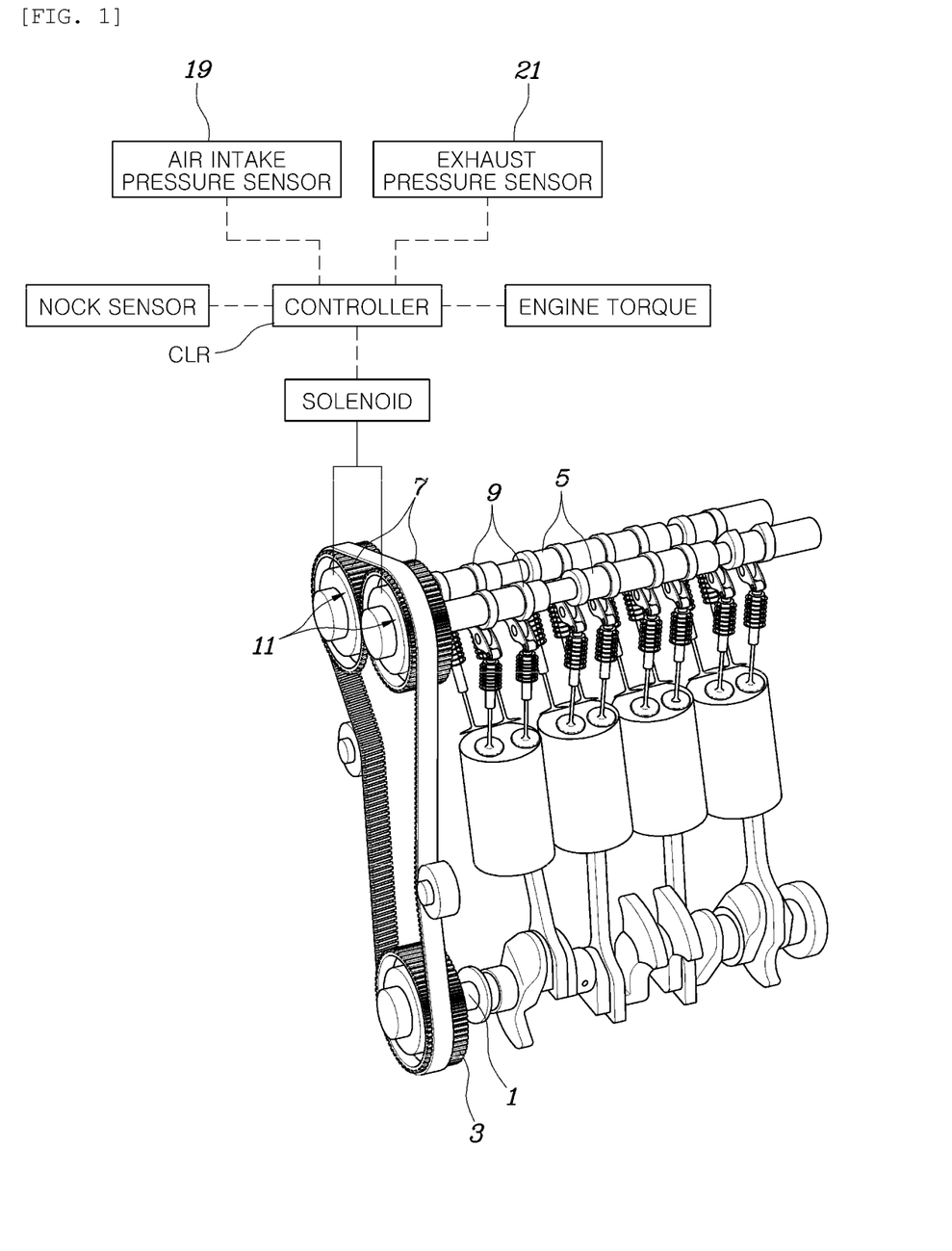
FIG. 1 is a view showing an example of a 2-cycle engine according to a form of the present disclosure.
Figure 2:
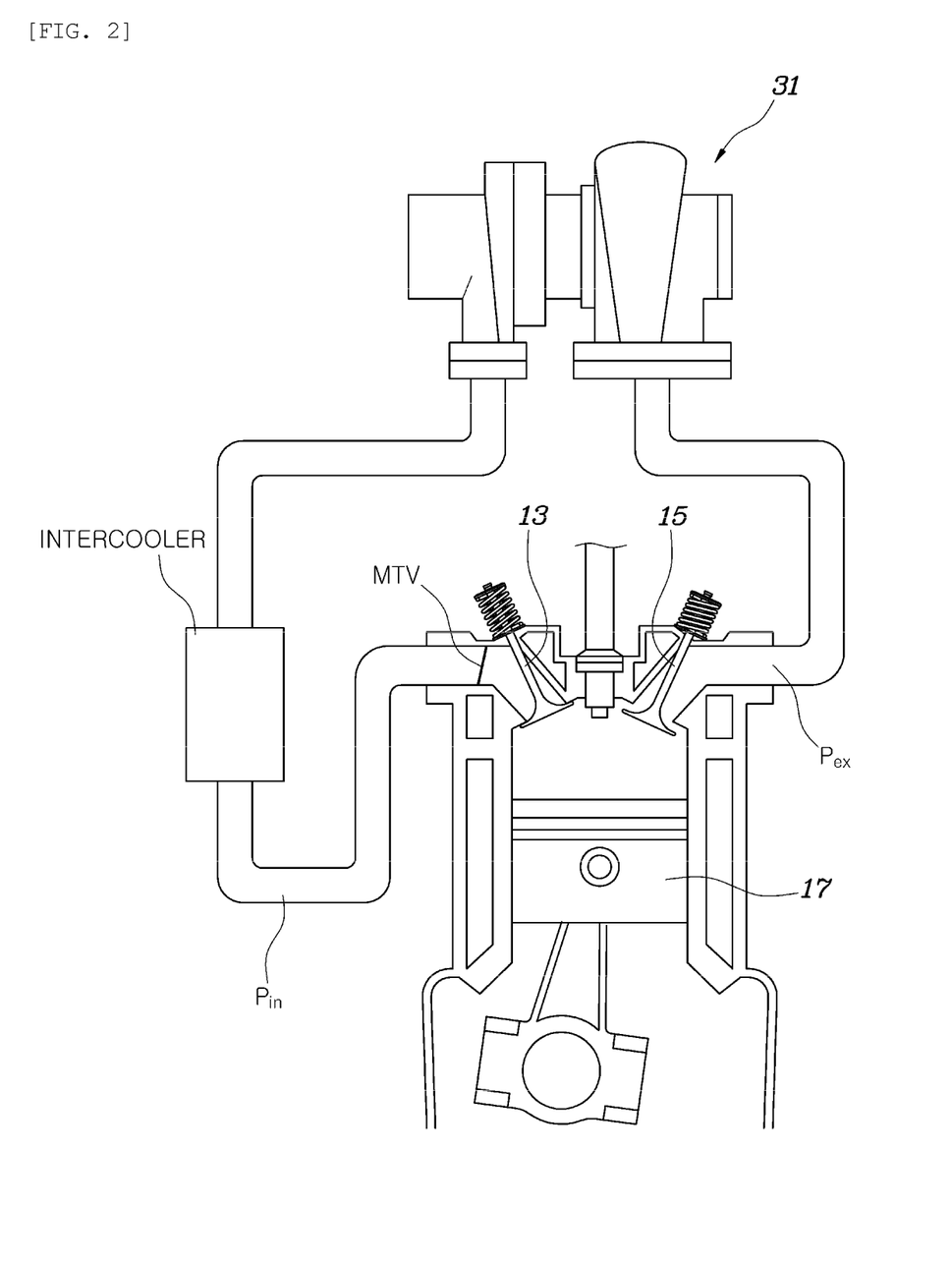
FIG. 2 is a view showing a structure of the 2-cycle engine according to a form of the present disclosure to which a turbocharger is mounted and showing a part at which an intake pressure and an exhaust pressure are measured.

Referring to FIGS. 1 and 2, an engine which is applicable to the present disclosure has a structure as follows. The engine system is configured such that a crankshaft 1 is mounted to a crank sprocket 3, a camshaft 5 is mounted to a cam sprocket 7, and a timing belt ora chain is put on the crank sprocket 3 and the cam sprocket 7 in order to allow the camshaft 5 to be rotated in conjunction with a rotation of the crankshaft 1.

The camshaft 5 is provided with a cam 9, and the cam 9 is configured to apply an actuating force to a valve system including an air intake valve 13, an exhaust valve 15, and a valve spring depending on the cam rotation, so that the valves can be opened and closed. That is, since the cam profile form determines valve timing, a lift amount, and valve duration, a cycle from air intake to exhaust can be performed. The camshaft 5 is preferably a pair of camshafts arranged parallel to one another, as depicted, however a single camshaft 5 could be used with appropriately formed sprockets 7 and cams 9 to operate both the intake valves 13 and the exhaust valves 15.

In addition, a turbocharger 31 is mounted in the engine to supply compressed air into a cylinder, and the turbocharger 31 may be a supercharger.

In the turbocharger 31, when a turbine is rapidly rotated due to discharging of exhaust gas and thus a compressor is rotated together by an actuating force of the turbine, the turbocharger 31 compresses air inflowing through an air filter.

Here, the compressed air is cooled by passing through an intercooler, and the cooled air is supplied to a cylinder through an air intake manifold.

As a manifold throttle valve (MTV) or a tumble port is applicable to an air intake port of the engine, flow of air intake is intensified, so that combustion can be stabilized in a high exhaust gas recirculation (EGR) ratio.

In addition, a water injection is mounted in the air intake port to inject water, thereby reducing temperature of the engine and increasing air density, so that engine knocking can be suppressed in a knocking area.

Meanwhile, the present disclosure is characterized in that a 2-cycle engine may be realized while an existing 4-cycle engine is used as it is.

In order to realize the technical feature of the present disclosure, the 2-cycle engine of the present disclosure is configured such that the air intake valve 13 and the exhaust valve 15 are opened and closed once, respectively, during one cycle of the crankshaft 1.

Therefore, the present disclosure proposes that the crankshaft 1 and the camshaft 5 are rotated at a rotation ratio of 1 to 1 (1:1).

That is, in case of the existing 4-cycle engine, the camshaft 5 is rotated once thereby performing a cycle from air intake to exhaust when the crankshaft 1 is rotated twice. However, in case of the present disclosure, the camshaft 5 is rotated once thereby performing the cycle from air intake to exhaust when the crankshaft 1 is rotated once.

In addition, according to an exemplary form of the present disclosure, the crankshaft 1 and the camshaft 5 are rotated at the rotation ratio of 1:1, gear teeth of the crank sprocket 3 mounted to the crankshaft 1 and gear teeth of the cam sprocket 7 mounted to the camshaft 5 are formed in sizes and shapes corresponding to each other, as shown in FIG. 1.

That is, the sizes and the shapes of the crank sprocket 3 and the cam sprocket 7 are formed in the same, thereby providing the rotation ratio of the crankshaft 1 and the camshaft 5 to 1:1.

As compared with the existing 4-cycle engine, a size of the crank sprocket 3 (which is smaller than the cam sprocket in the 4-cycle engine) is increased to have the same size as the cam sprocket 7 in the 2-cycle engine, or a size of the cam sprocket 7 (which is bigger than the crank sprocket in the 4-cycle engine) is reduced to have the same size as the crank sprocket 3 in the 2-cycle engine. However, when the size of the cam sprocket 7 is reduced to have the same size as the crank sprocket 3 in the 2-cycle engine, a height of an engine head can be reduced, which is preferable.

In addition, according to another form of the present disclosure, the air intake valve 13 and the exhaust valve 15 are respectively opened and closed once during the crankshaft 1 is rotated once, the crankshaft 1 and the camshaft 5 may be rotated at a rotation ratio of 2 to 1 (2:1), and the cam provided on the camshaft 5 may be provided with two cam lobes which are symmetrically disposed.

That is, although the camshaft 5 is rotated once when the crankshaft 1 is rotated twice like the existing 4-cycle engine, since the cam is provided with the two cam lobes, the air intake valve and the exhaust valve are respectively opened and closed once when the crankshaft 1 is rotated once, thereby proceeding a cycle from air intake to exhaust.

According to this structure described above, since one explosion cycle is performed during every one crankshaft rotation in the present disclosure, air displacement of the engine is reduced as compared with a 4-cycle engine of the same output thereby reducing a size and weight of an engine, and since the number of cycle is reduced in comparison with the 4-cycle engine, friction and exhaust, and cooling loss are also reduced thereby improving fuel efficiency.

In addition, by realizing the 2-cycle engine using the existing 4-cycle engine without changing, product lines for the 2-cycle engine are not be desired and product cost of the engine can be reduced.

Figure 5:
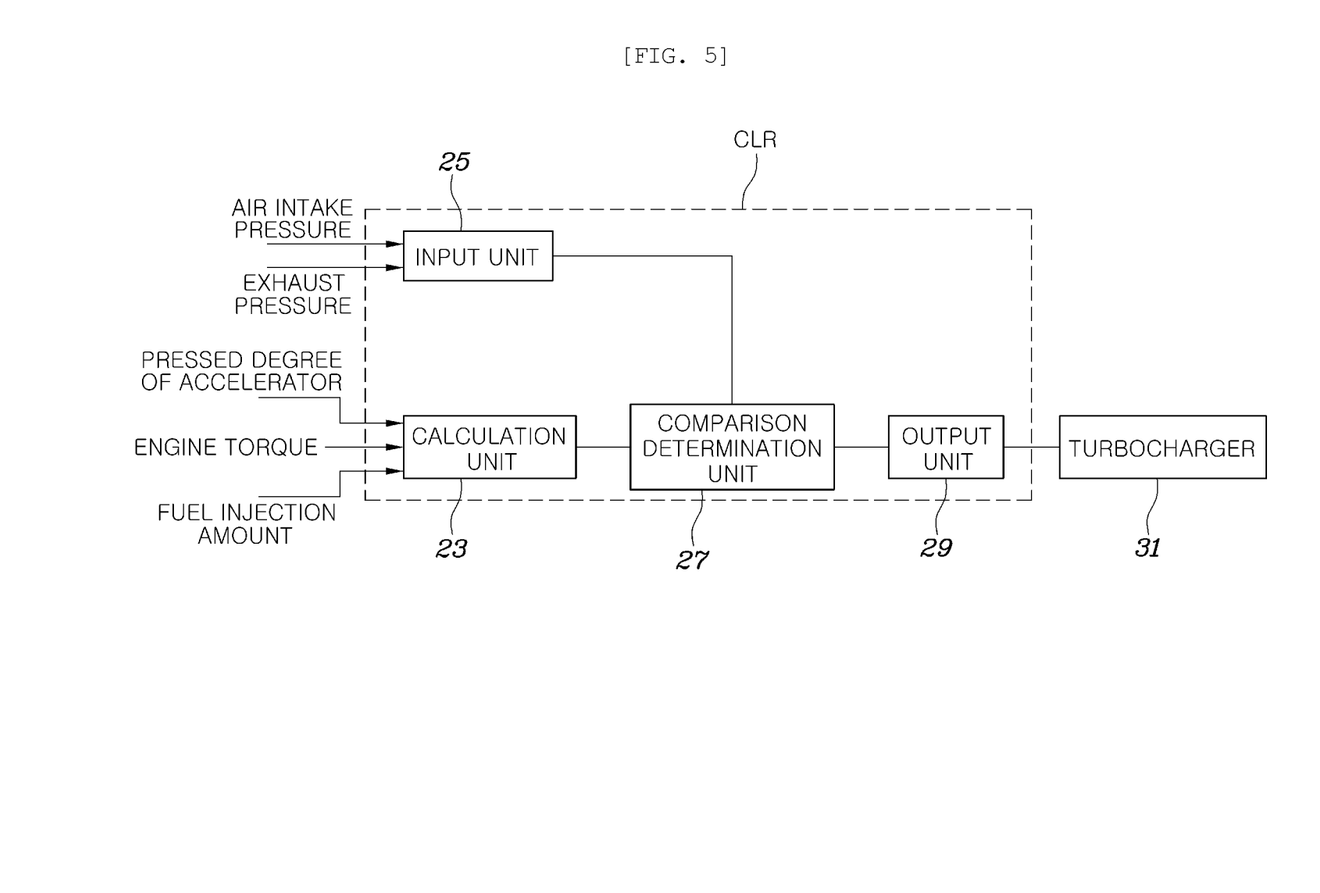
FIG. 5 is a block diagram showing a system of a controller which controls the turbocharger depending on an engine operation condition according to a form of the present disclosure.

Meanwhile, as shown in FIG. 5, the 2-cycle engine of the present disclosure may include a controller (CLR) for controlling operation of the turbocharger 31 using a difference between an air intake pressure (Pin) and an exhaust pressure (Pex) so that a current air intake reaches a target air intake. The controller (CLR) includes a calculation unit 23, an input unit 25, a comparison determination unit 27, and an output unit 29.

Here, the controller according to the exemplary form of the present disclosure is realized by an algorithm configured to control operations of various components of a vehicle or a non-volatile memory configured to store data regarding software instructions for running the algorithm (not shown) and a processor configured to perform operations described below using the data stored in the memory (not shown). Here, the memory or the processor may be realized with a separate chip. Alternately, the memory and the processor may be realized together with an integral single chip. The processor may be configured as at least one processor.

In FIG. 5, the calculation unit 23 calculates engine demand torque based on factors reflecting vehicle traveling conditions, calculates a target air intake desired for generating the engine demand torque when current engine torque is less than the engine demand torque, and calculates a target air intake/exhaust pressure difference value (ΔP_target) corresponding to the target air intake.

Here, an air intake may be calculated using the following formulas, so when a target air intake is calculated, a target air intake/exhaust pressure difference value (ΔP_target) may be calculated using the following formulas:

Air intake=(air density @ Pin−air density @ Pex)
*volume of cylinder (Vcyl), where Pin=air intake pressure (closing timing of air intake valve), and Pex=exhaust pressure (closing timing of exhaust valve).

That is, since a value obtained by reducing air density at Pex from air density at Pin may be calculated as the difference between the air intake pressure (Pin) and the exhaust pressure (Pex), when a target air intake is calculated, a target air intake/exhaust pressure difference value (ΔP_target) corresponding thereto may be calculated.

In addition, the input unit 25 receives a current air intake pressure (Pin) by an air intake pressure sensor 19 provided in the air intake manifold, and receives a current exhaust pressure (Pex) by an exhaust pressure sensor 21 provided in the exhaust manifold.

The input unit 25 receives an air intake pressure (Pin) at an air intake valve closing timing as the current air intake pressure (Pin), and an exhaust pressure (Pex) at an exhaust valve closing timing as the current exhaust pressure (Pex).

The comparison determination unit 27 compares a current air intake/exhaust pressure difference value (ΔP: Pin-Pex) and the target air intake/exhaust pressure difference value (ΔP_target), wherein the current air intake/exhaust pressure difference value (ΔP: Pin-Pex) is a difference value between a current air intake pressure (Pin) and a current exhaust pressure (Pex).

The output unit 29 compares the target air intake/exhaust pressure difference value (ΔP_target) and the current air intake/exhaust pressure difference value (ΔP). With the comparison result, when the target air intake/exhaust pressure difference value (ΔP_target) is higher than the current air intake/exhaust pressure difference value (ΔP), the output unit 29 transmits a signal to control rotation speed of the turbocharger 31 to increase the rotation speed. Whereas, when the target air intake/exhaust pressure difference value (ΔP_target) is equal to or less than the current air intake/ exhaust pressure difference value (ΔP), the output unit 29 transmits a signal to control the rotation speed of the turbocharger 31 to reduce the rotation speed. In addition, it is possible to control the rotation speed of the turbocharger 31 through a pressure control valve provided in the turbocharger 31.

Figure 7:
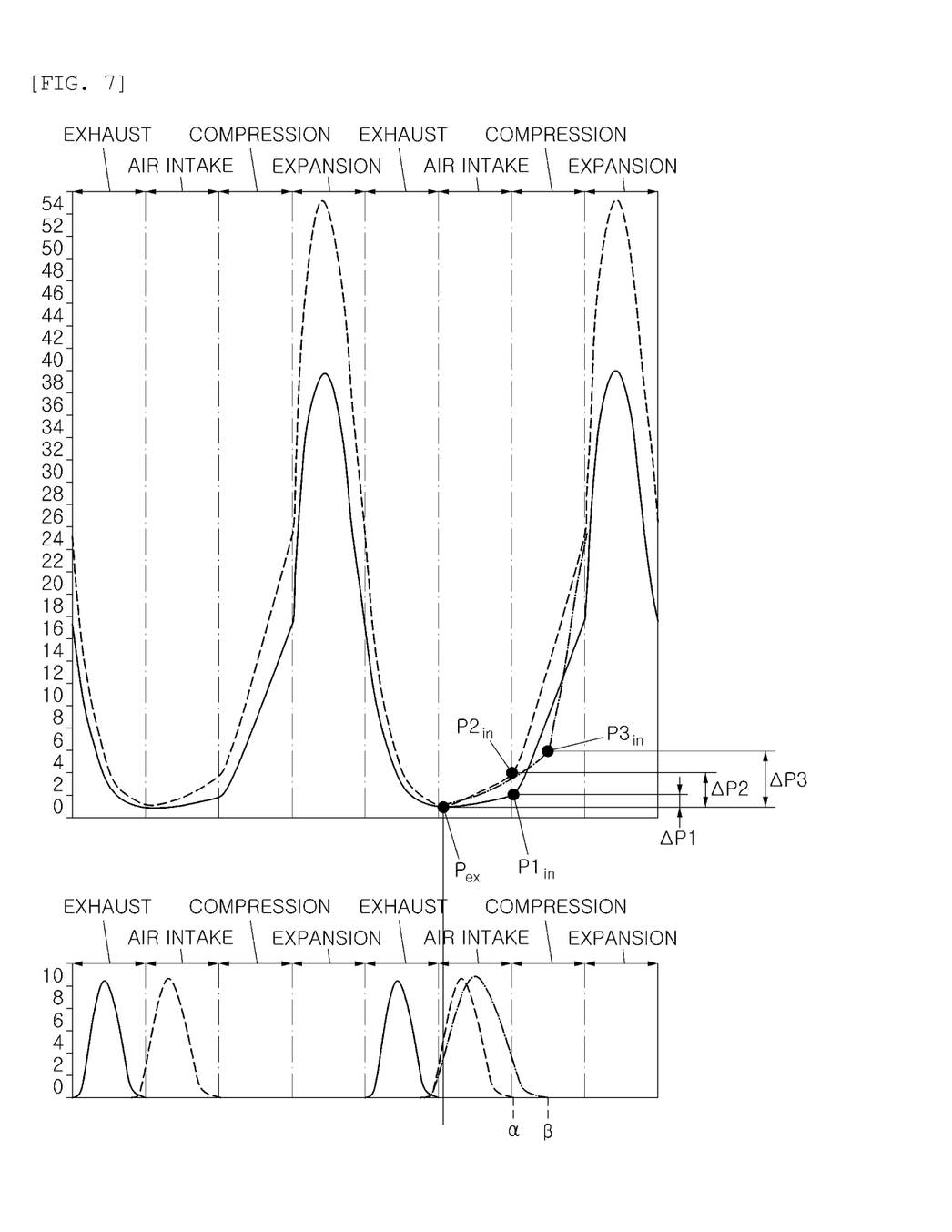
FIG. 7 is a graph showing a control status of the turbocharger in the 2-cycle engine according to a form of the present disclosure and showing pressures of a valve lift and a combustor depending on valve timings.

For example, when an air intake pressure is a P1*in* and an exhaust pressure is the Pex as shown in FIG. 7, a current air intake/exhaust pressure difference value is a ΔP1.

When the ΔP1 is compared with the target air intake/exhaust pressure difference value ΔP_target, and the ΔP1 is smaller than the ΔP_target, the controller controls the turbocharger 31 to increase the rotation speed of the turbocharger 31, thereby increasing an air intake pressure. Thus, when the air intake pressure is a P2*in*, a current air intake/exhaust pressure difference value is a ΔP2.

Next, by comparing the ΔP2 with the ΔP_target, when the ΔP2 is smaller than the ΔP_target, the rotation speed of the turbocharger 31 is controlled to be increased. Whereas, when the ΔP2 reaches the ΔP_target, the controller controls the rotation speed of the turbocharger 31 to be reduced, so an air intake pressure is lowered.

That is, when a current air intake/exhaust pressure difference value (ΔP) is equal to or less than the target air intake/exhaust pressure difference value (ΔP_target), since a current air intake is insufficient to reach the engine demand torque, the controller controls to increase the rotation speed of the turbocharger 31. Thus, by increasing an air intake by introducing a large amount of compressed air into the cylinder, engine torque is increased to satisfy the engine demand torque.

Meanwhile, when the current air intake/exhaust pressure difference value (ΔP) is higher than the target air intake/exhaust pressure difference value (ΔP_target), the engine demand torque is satisfied with an existing air intake without difficulty. Here, the controller controls the rotation speed of the turbocharger 31 to be reduced.

Figure 4:
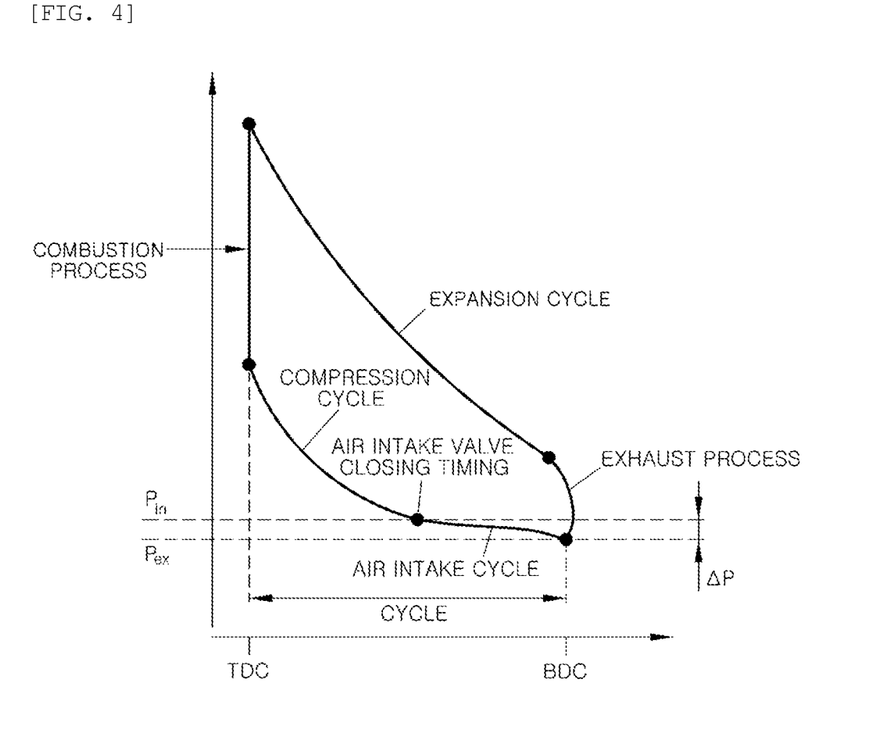
FIG. 4 is a P-V diagram of the 2-cycle engine according to a form of the present disclosure.

As shown in FIG. 4, in the 2-cycle engine of the present disclosure, valve timings of the air intake valve 13 and the exhaust valve 15 may be determined so that a cycle of air intake-compression-expansion-exhaust is performed during a first cycle in which a piston 17 (see FIG. 2) is moved from a bottom dead center (BDC) to a top dead center (TDC) depending on the crankshaft rotation and during a second cycle in which the piston 17 is moved from the TDC to BDC.

The valve timings may be determined by the profile form of the cam 9, and in the present disclosure, may be determined through a variable valve device 11 or the controller (CLR), as shown in FIG. 1. The variable valve device 11 controls the valve timings of the air intake valve 13 and the exhaust valve 15, and the controller (CLR) controls the variable valve device 11 by receiving the engine operation condition.

The variable valve device 11 may be a continuously variable valve timing (CVVT), a variable valve duration (VVD), a continuously variable valve duration (CVVD), or a variable valve lift (VVL), and continuously variable valve lift (CVVL).

Figure 3:
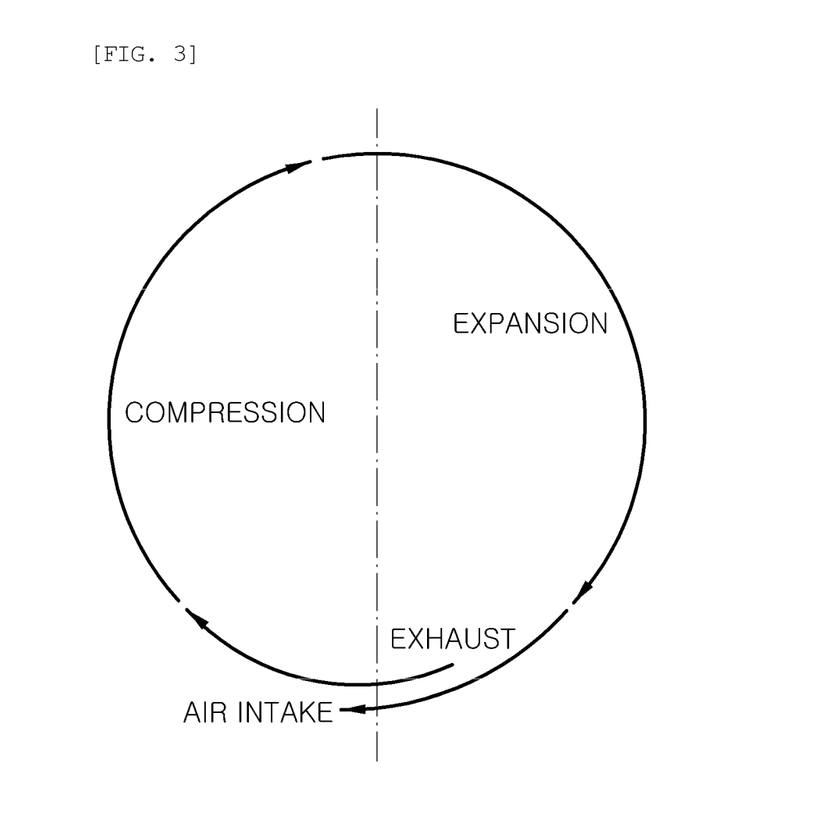
FIG. 3 is a graph showing an example of a valve timing of the 2-cycle engine according to a form of the present disclosure.

The controller (CLR) may control operation of the variable valve device 11 so that the exhaust valve 15 is opened when the piston 17 is moved from the TDC to the BDC, and is closed at a timing at which the exhaust pressure is equal to or less than a reference value near the BDC, as shown in FIGS. 3 and 4.

In addition, the controller (CLR) may control to open the air intake valve 13 when the piston is near the BDC, and to close the air intake valve 13 after the piston passes the BDC.

That is, the controller (CLR) may control to open the exhaust valve 15 in a process in which the piston 17 is moved from the TDC to the BDC after an expansion cycle. The controller (CLR) may control to close the exhaust valve 15 after the piston passes the BDC at which the exhaust pressure is sufficiently reduced.

In addition, the controller (CLR) may control to open the air intake valve 13 before the piston passes the BDC so that the air intake valve 13 and the exhaust valve 15 overlaps together, and the controller (CLR) may control to close the air intake valve 13 at a suitable timing after the piston passes the BDC.

Then, as a compression cycle is performed and combustion is started near the TDC, the expansion cycle may be performed after the piston passes the TDC.

Especially, in the present disclosure, the controller (CLR) may receive a signal from a knocking sensor, determine whether or not the engine knocks by the signal from the knocking sensor, and control the variable valve device 11 so that the variable valve device 11 controls a closing timing of the air intake valve.

For example, when the air intake valve closing timing is α° after the BDC as shown in FIG. 7, an air intake pressure is the P2*in*. In this state, when the air intake valve closing timing is delayed to α°+β° after the BDC, the air intake pressure is increased and becomes a P3*in*.

That is, when the engine knocks in an engine operating condition of the P2*in* air intake pressure, and the air intake pressure is adjusted to the P3*in* by delaying the air intake closing timing, as a difference value between an air intake pressure and an exhaust pressure is increased by the ΔP3 and an actual compression ratio is reduced, so that it is possible to reduce the engine knocks.

Figure 8:
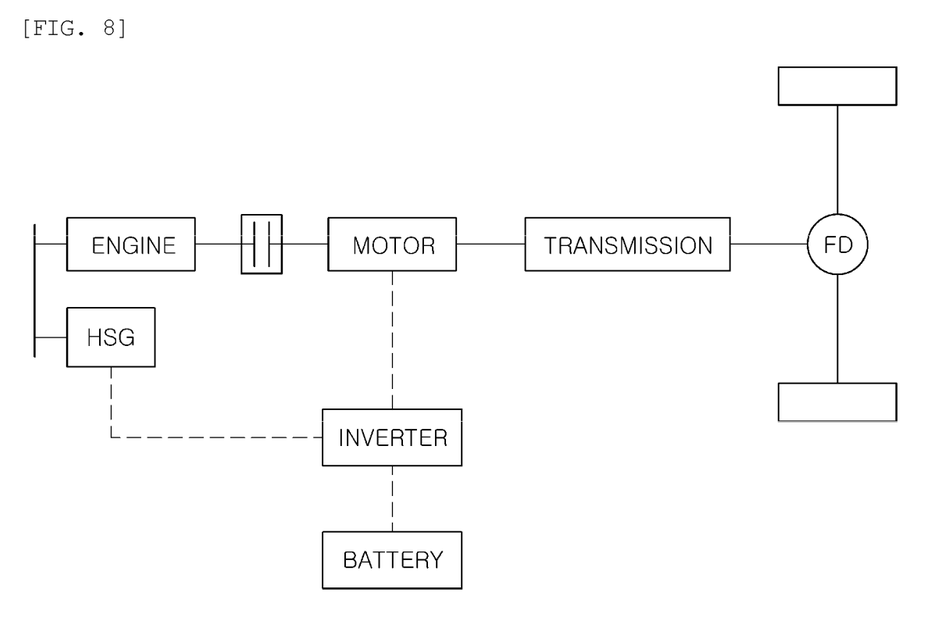
FIG. 8 is a block diagram showing a hybrid system to which the 2-cycle engine according to a form of the present disclosure is applicable.

In addition, as shown in FIG. 8, the 2-cycle engine of the present disclosure includes a motorization device which includes a motor, a generator, and an inverter in order to generate an electrical driving force along with a driving force of the engine.

Meanwhile, the air intake valve and the exhaust valve are disposed at an upper portion of the cylinder and are controlled by a cam.

For example, the 2-cycle engine of the present disclosure may be applied to a hybrid system as shown in FIG. 8, wherein a motor is connected to the engine by a media of an engine clutch so as to be power switchable, the engine is provided with a hybrid starter generator (HSG) which is capable of starting or generating through a belt pulley, the motor and the HSG are connected to the inverter and a current may be converted.

That is, when the 2-cycle engine of the present disclosure is applied to the hybrid system, since volumes of the motor, the generator, and the inverter can increase as much as a volume of the engine is reduced, efficiency of a hybrid vehicle can be increased.

Meanwhile, as a method for controlling the 2-cycle engine with the valve system according to the present disclosure, the method may be configured such that the controller (CLR) controls operation of the turbocharger 31 using difference between an air intake air pressure (Pin) and an exhaust pressure (Pex), so that a current air intake reaches the target air intake.

Figure 6:
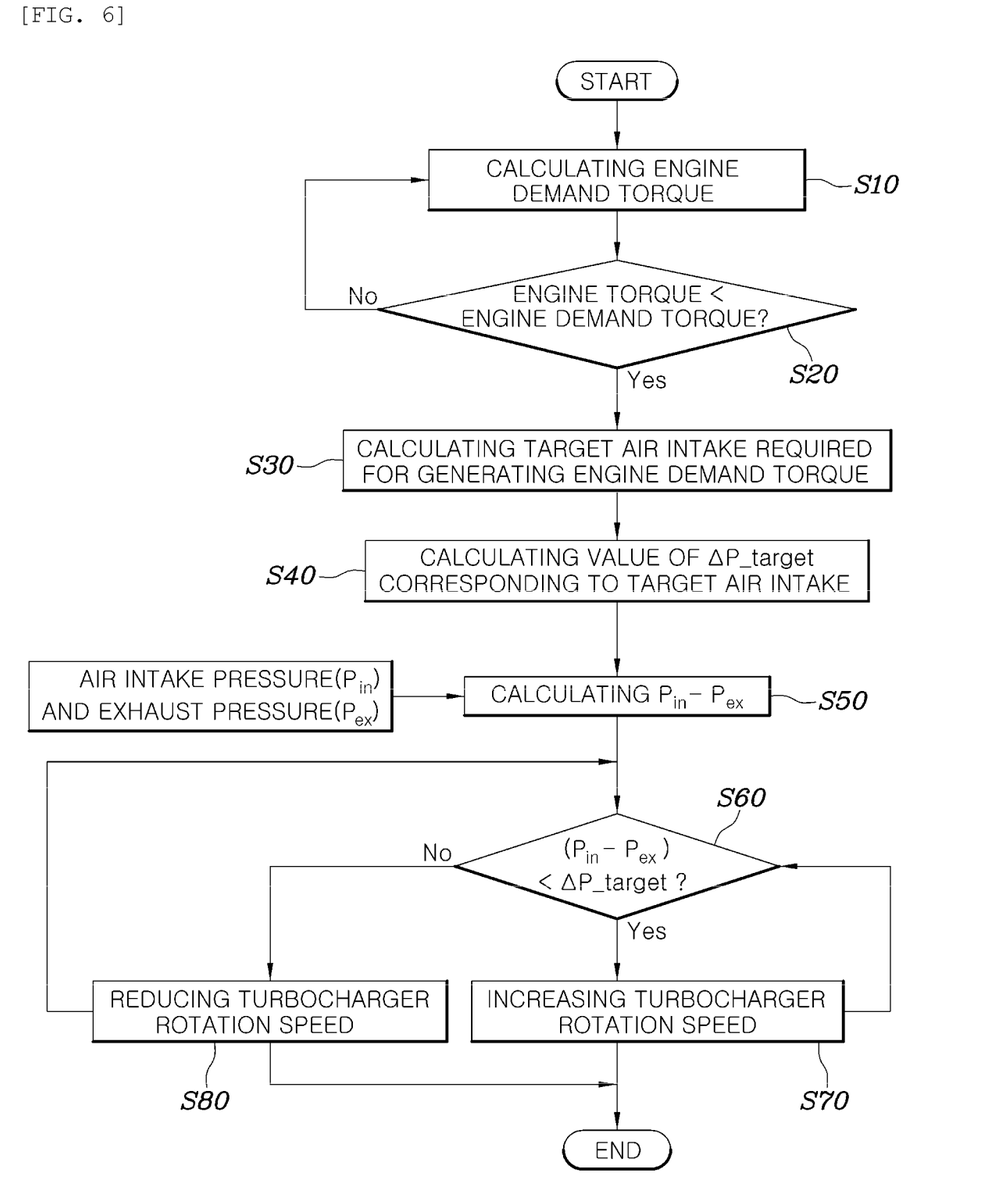
FIG. 6 is a flowchart showing a control process in which the turbocharger is controlled depending on the 2-cycle engine operation condition according to a form of the present disclosure.

The method may be realized through a process of FIG. 6, the engine demand torque is calculated on the basis of factors reflecting vehicle traveling conditions (S10). Here, the factors reflecting vehicle traveling conditions may be a pressed degree of accelerator and a fuel injection amount.

Then, it is determined whether the current engine torque is less than the engine demand torque (S20), and when the engine torque is less than the engine demand torque after determining, the target air intake is calculated desired for generating the engine demand torque (S30).

The target air intake/exhaust pressure difference value ($\Delta P\_target$) corresponding to the target air intake is calculated (S40).

Then, a current air intake/exhaust difference value ($\Delta P$) is calculated by receiving a current air intake pressure of the air intake manifold and a current exhaust pressure of the exhaust manifold from the air intake pressure sensor 19 and the exhaust pressure sensor 21 (S50).

Next, by comparing the current air intake/exhaust difference value ($\Delta P$) with the target air intake/exhaust difference value ($\Delta P\_target$) (S60), when the comparison result is obtained such that the target air intake/exhaust difference value ($\Delta P\_target$) is higher than the current air intake/exhaust difference value ($\Delta P$), the controller controls to increase rotation speed of the turbocharger 31 (S70).

Whereas, when the target air intake/exhaust difference value ($\Delta P\_target$) is equal to or less than the current air intake/exhaust difference value ($\Delta P$), the controller controls rotation speed of the turbocharger 31 to be reduced (S80).

As described above, since the 2-cycle engine of the present disclosure is configured such that one expansion cycle is performed during every one crankshaft rotation, air displacement of the engine is reduced in comparison with the same output 4-cycle engine, thereby reducing a size and weight of the engine. In addition, as the number of cycle is reduced, friction and exhaust, and cooling loss are also reduced, thereby improving fuel efficiency.

In addition, in case of applying the 2-cycle engine to the hybrid vehicle, since a volume of the motorization device (the motor-the inverter-the generator) can be increased as a volume of the engine is reduced, efficiency of the hybrid vehicle can be increased.

In addition, by comparing a current air intake/exhaust pressure difference value ($\Delta P$) and the target air intake/exhaust pressure difference value ($\Delta P\_target$), and varying rotation speed of the turbocharger 31, air amount flowing into the cylinder can be controlled and thus reliability combustion performance can be secured depending on engine load desired from the vehicle.

While this present disclosure has been described in connection with what is present considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A 2-cycle engine with a valve system, the 2-cycle engine comprising:
    a camshaft rotated in conjunction with a crankshaft;
    a valve system configured such that an air intake valve and an exhaust valve are opened or closed depending on the camshaft rotation;
    a turbocharger compressing air and supplying the compressed air into a cylinder; and
    a controller controlling operation of the turbocharger using a difference between an intake pressure and an exhaust pressure so that a current air intake reaches a target air intake,
    wherein the air intake valve and the exhaust valve are opened and closed once, respectively, during one crankshaft rotation,
    wherein the controller comprises:
        a calculation unit that calculates engine demand torque based on factors reflecting vehicle traveling conditions, calculates the target air intake desired for generating the engine demand torque when current engine torque is less than the engine demand torque, and calculates a target air intake/exhaust pressure difference value corresponding to the target air intake;
        an input unit receiving a current intake pressure of an air intake manifold at an air intake valve closing time and a current exhaust pressure of an exhaust manifold at an exhaust valve closing time;
        a comparison determination unit comparing a current air intake/exhaust pressure difference value that is a difference value between the current intake pressure of the air intake manifold at the air intake valve closing time and the current exhaust pressure of the exhaust manifold at the exhaust valve closing time with the target air intake/exhaust pressure difference value; and
        an output unit configured to increase a rotation speed of the turbocharger when the target air intake/exhaust pressure difference value is higher than the current air intake/exhaust pressure difference value, and configured to decrease the rotation speed of the turbocharger when the target air intake/exhaust pressure difference value is equal to or less than the current air intake/exhaust pressure difference value.

2. The 2-cycle engine of claim 1, wherein the crankshaft and the camshaft are rotated at a rotation ratio of 1 to 1 (1:1).

3. The 2-cycle engine of claim 2, wherein gear teeth of a crank sprocket mounted to the crankshaft and gear teeth of a cam sprocket mounted to the camshaft are formed in sizes and shapes corresponding to each other.

4. The 2-cycle engine of claim 1, wherein the crankshaft and the camshaft are rotated at a rotation ratio of 2 to 1 (2:1), and a cam provided on the camshaft is provided with two cam lobes that are symmetrically disposed.

5. The 2-cycle engine of claim 1, wherein valve timings of the air intake valve and the exhaust valve are determined so that a cycle of air intake-compression-expansion-exhaust is performed, during a first cycle in which a piston is moved from a bottom dead center to a top dead center depending on the crankshaft rotation and a second cycle in which the piston is moved from the top dead center to the bottom dead center,
    the controller controls the exhaust valve to be opened during a process in which the piston is moved downward from the top dead center to the bottom dead center and to be closed at a timing at which the exhaust pressure is equal to or less than a reference value when the piston is near the bottom dead center, and
    the controller controls the air intake valve to be opened, and to be closed after the piston passes the bottom dead center.

6. The 2-cycle engine of claim 5, further comprising:
    a variable valve device controlling the valve timings of the air intake valve and the exhaust valve,
    wherein the controller determines whether the engine knocks, and the controller controls operation of the variable valve device so that the variable valve device controls a closing timing of the air intake valve.

7. The 2-cycle engine of claim 1, further comprising:

a motorization device including a motor, a generator, and an inverter in order to generate an electrical driving force along with a driving force of the engine.

8. The 2-cycle engine of claim 1, wherein the air intake valve and the exhaust valve are disposed at an upper portion of the cylinder and are controlled by a cam.

9. A method for controlling a 2-cycle engine comprising a camshaft rotated in conjunction with a crankshaft, a valve system configured such that an air intake valve and an exhaust valve are opened or closed depending on the camshaft rotation, a turbocharger compressing air and supplying the compressed air into a cylinder, and a controller controlling operation of the turbocharger, wherein the air intake valve and the exhaust valve are opened and closed once, respectively, during one crankshaft rotation, the method comprising:

controlling operation of the turbocharger using a difference between an intake pressure and an exhaust pressure so that a current air intake reaches a target air intake;

calculating engine demand torque based on factors reflecting a vehicle traveling state;

calculating target air intake desired for generating the engine demand torque when current engine torque is less than the engine demand torque;

calculating a target air intake/exhaust pressure difference value corresponding to the target air intake;

receiving a current intake pressure of an air intake manifold at an air intake valve closing time and a current exhaust pressure of an exhaust manifold at an exhaust valve closing time;

calculating a current air intake/exhaust pressure difference value by comparing the current intake pressure of the air intake manifold at the air intake valve closing time and the current exhaust pressure of the exhaust manifold at the exhaust valve closing time; and controlling a rotation speed of the turbocharger to increase the rotation speed when the target air intake/exhaust pressure difference value is higher than the current air intake/exhaust pressure difference value, and controlling the rotation speed of the turbocharger to decrease the rotation speed when the target air intake/exhaust pressure difference value is equal to or less than the current air intake/exhaust pressure difference value.

* * * * *